United States Patent [19]

Baatrup

[11] 4,182,219
[45] Jan. 8, 1980

[54] HYDRAULIC CONTROL SYSTEM FOR TWO OPERATING CYLINDERS

[75] Inventor: Johannes V. Baatrup, Sonderborg, Denmark

[73] Assignee: Danfoss A/S, Nordborg, Denmark

[21] Appl. No.: 944,360

[22] Filed: Sep. 21, 1978

Related U.S. Application Data

[63] Continuation of Ser. No. 825,678, Aug. 18, 1977, abandoned.

[30] Foreign Application Priority Data

Jul. 7, 1977 [DE] Fed. Rep. of Germany ....... 2638239

[51] Int. Cl.² ........................... F01B 1/00; F15B 15/17
[52] U.S. Cl. ......................................... 91/186; 91/415; 91/467
[58] Field of Search ................................... 91/186, 415

[56] References Cited

U.S. PATENT DOCUMENTS

| | | | |
|---|---|---|---|
| 2,763,990 | 9/1956 | Mercier | 91/186 |
| 2,859,592 | 11/1958 | Mercier et al. | 91/186 |

FOREIGN PATENT DOCUMENTS 138483  9/1901  Fed. Rep. of Germany ............. 91/415

Primary Examiner—Paul E. Maslousky
Attorney, Agent, or Firm—Wayne B. Easton

[57] ABSTRACT

The invention relates to a hydraulic control system for a vehicle steering system or the like. The system includes two hydraulic cylinders each having a piston and a piston rod extending through one end thereof with the rod side of each piston having a smaller pressure area than the opposite side thereof. The pistons are mechanically interconnected by their piston rods. Each of the cylinders has first and second ports respectively at the nonpiston and piston ends thereof. There is a source of fluid pressure and an exhaust tank and a separate valve unit for each of the cylinders. A valve operating unit includes a steering wheel for operating the valve units in unison. The valve units have passages arranged so that for turning in either direction the first and second ports of one cylinder and the second port of the other cylinder are connected to the pressure source. At the same time the first port of the other cylinder is connected to said exhaust tank. The system includes metering units and the valve passages are arranged so that the involved metering unit is in series with the pressure source for either direction of turning. The valve operating unit includes a pair of shafts and a steering wheel for turning the shafts.

6 Claims, 2 Drawing Figures

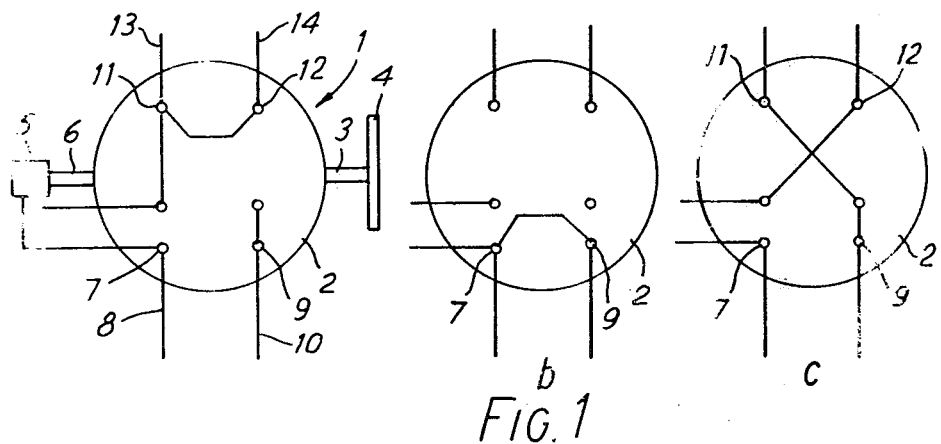
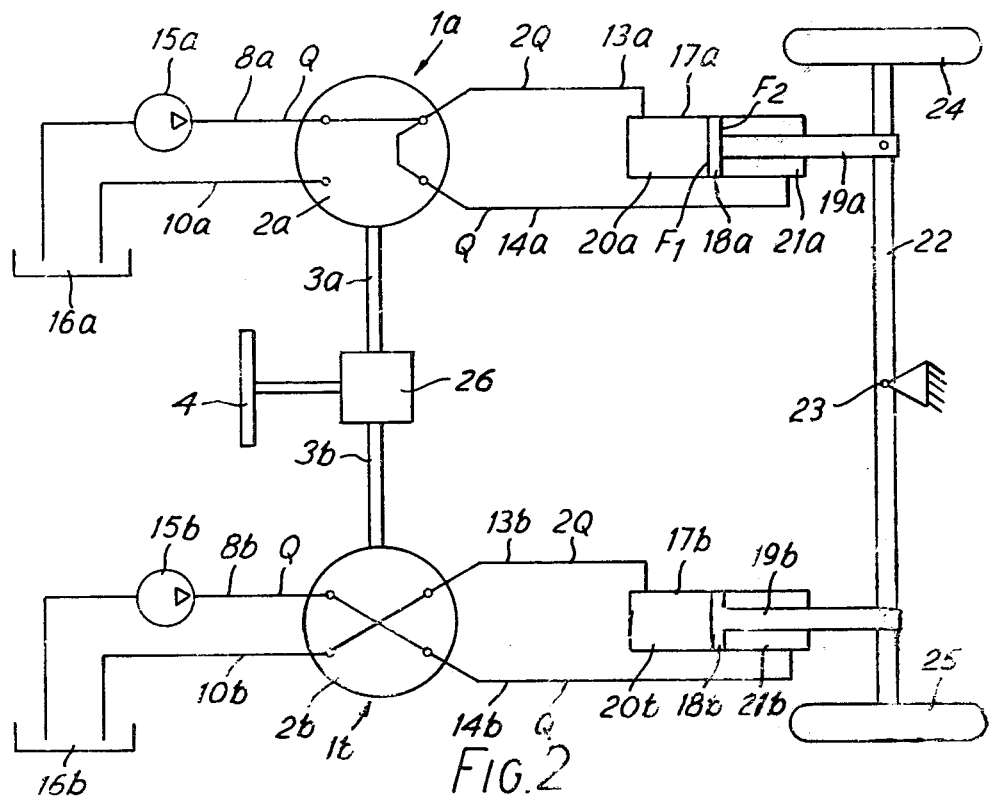

HYDRAULIC CONTROL SYSTEM FOR TWO OPERATING CYLINDERS

This is a Continuation Application of Ser. No. 825,678 filed Aug. 18, 1977 and now abandoned.

The invention relates to a hydraulic control system for two operating cylinders of which the pistons are mechanically interconnected by their piston rods and each have different pressure areas, comprising a control device which has one control valve for each operating cylinder, which is adjustable by an actuating member, e.g. a steering wheel, and a measuring device and, on displacement from the neutral position, passes pressure fluid to the cylinder chamber of larger pressure area or the cylinder chamber of smaller pressure area depending on the direction of displacement, the measuring device having two flow paths for the pressure fluid flowing in equal quantities from the pressure source to a respective one of the two operating cylinders.

In a known control system of this kind, each operating cylinder is associated with a control valve in the form of an axial slide valve. The control valves are displaced by the outer gear of planet gearing. The planet gearing is connected to a steering wheel as well as to a dual flow measuring pump. Pressure fluid flows from a common pump through the first control valve, the one flow path of the measuring pump and the other control valve to the associated operating cylinder and from there through the last-mentioned control valve to the tank. The same applies to the other operating cylinder. In order that equal quantities of pressure fluid flow through the measuring pump, the larger pressure areas of the pistons are subjected to pressure in the one adjusting direction of the control valves and the smaller pressure areas in the other adjusting direction. The result of this is that the operating element connected to the pistons is subjected to different pressure and speed conditions in the two adjusting directions.

It is also known to give the two pistons pressure areas in the ratio of 2:1, the larger pressure area of the one piston and the smaller pressure area of the other being in each case simultaneously subjected to pressure fluid. This gives the same pressure and speed conditions for both adjusting directions. However, since twice as much pressure fluid must now be fed to the one cylinder than to the other and these conditions may be reversed during operation, only one flow path is now provided in the measuring device for that quantity of pressure fluid that is led to the cylinder chamber having a smaller pressure area. The pressure fluid fed to the chamber of larger pressure area of the other operating cylinder is not measured. This leads to inaccuracies. In addition, one requires a complicated control valve which effects separate control of the measured and unmeasured pressure fluid and must switch the measured fluid from the one operating cylinder to the other.

The invention is based on the problem of providing a hydraulic control system of the aforementioned kind in which the same conditions obtain in both adjusting directions despite differently large piston pressure areas and measurement of the quantity of pressure fluid in both conduits leading from the pressure source to the operating cylinders.

This problem is solved according to the invention by the combination of the following features:

(a) The pressure areas of each piston are in the ratio 2:1, the larger pressure area of the one piston and the smaller pressure area of the other piston being in each case subjected to the pressure fluid simultaneously.

(b) In the one actuating direction, the control valve connects the cylinder chamber of larger pressure area to the tank and the cylinder chamber of smaller pressure area to the pressure source, and in the other actuating direction it connects the cylinder chamber of larger pressure area to the pressure source and to the cylinder chamber of smaller pressure area, but both cylinder chambers being separated from the tank.

(c) The actuating member is connected to both control valves such that the actuating direction of the control valves is opposite in each case.

If the actuating member is adjusted in the one direction, the chamber of smaller pressure area of the one operating cylinder receives the quantity Q of pressure fluid. From its chamber of larger pressure area, 2Q flow back to the tank. The chamber of larger pressure area of the other operating cylinder is simultaneously supplied with the quantity Q of pressure fluid from the pressure source and the quantity Q pushed out of its chamber of smaller pressure area, i.e. a total of 2Q. The same quantity is therefore measured in both measuring paths, namely Q. If the actuating member is adjusted in the other direction, the same effects are obtained in the respective other operating cylinder. In this way one obtains the same conditions in both actuating directions.

Another advantage resides in the fact that each control valve only has the functions that are allocated to the associated operating cylinder. Also, the part of the measuring device associated with this operating cylinder is independent from the other control valve. One can therefore combine the stated components in one unit.

With particular advantage, therefore, the control device comprises two identical control units, each equipped with a control valve, a measuring device with a flow path, particularly a measuring motor for follow control of the control valve, and a pressure source connection, a tank connection and two operating cylinder connections. These control units need merely be intercoupled on the side of the actuating member. These control units can be produced far more rationally than control devices that contain all functions. One can even use conventionally marketed control units, it merely being necessary to make slight alterations to the control valve. It is particularly recommended to employ control units of the kind described for example in U.S. Pat. No. 3,880,554.

In the neutral position of the control valves, there may be a direct connection between the pump and tank in both control units, which has already proved successful for individual control units.

In a preferred embodiment, the control units comprise control valves actuated by a rotatable shaft, and gearing is provided which transmits the rotary motion of a steering wheel to the rotatable shafts in opposite actuating senses.

The rotatable shafts may be directed towards each other and directly intercoupled and the steering wheel may drive the shafts together by way of the gearing.

The invention will now be described in more detail with reference to an example illustrated in the drawing, wherein:

FIG. 1 shows diagrams of the control units in different operating positions, and FIG. 2 is a circuit diagram of the control system according to the invention.

The control unit 1 shown in FIG. 1 comprises a control valve 2, a rotatable actuating shaft 3 which can be adjusted by an actuating member 4, and a measuring device 5, in this case a measuring motor, with an output shaft 6. There is a pressure source connection 7 for a pump conduit 8, a tank connection 9 for a tank conduit 10 and two operating cylinder connections 11 and 12 for operating conduits 13 and 14, respectively. This control unit works in such a way that, on adjustment of the actuating member 4, the control valve 2 connects the pump connection 7 to one of the operating cylinder connections 11 and 12, and the measuring motor 5, through which the pressure fluid will then flow from the pressure source to the operating cylinder, effects follow-up movement by way of the output shaft 6, so that the control valve assumes a neutral position and thus closes with respect to the conduits 13 and 14 when the actuating member 4 is no longer turned.

The control unit 1 which includes the measuring or metering device 5, the valve 2 and the steering or actuating shaft 3 is of a convention type developed a number of years ago and is more or less standard in power steering systems. Many patents, such as U.S. Pat. No. 3,880,554 disclose metering type control units of this kind.

FIG. 1b shows the neutral position of the control valve 2 in which the pressure source connection 7 and the connection 9 are directly interconnected. On rotation of the actuating member 4 in one direction, one obtains the operating position according to FIG. 1a in which the operating cylinder connection 11 is connected to the pressure source connection 7 as well as to the operating cylinder connection 12, whilst the tank connection 9 is blocked. In the other direction of rotation of the actuating member 4, the control valve 2 assumes the position of FIG. 1c in which the pressure source connection 7 communicates with the operating cylinder connection 12 and the tank connection 9 communicates with the operating cylinder connection 11.

Two control units 1a and 1b are provided in FIG. 2 and these both have the construction according to FIG. 1. The measuring motor 5 is omitted for clarity. The same reference numerals as in FIG. 1 are used with a suffix a or b. Each control unit is supplied by its own pump 15a or 15b and has its own tank 16a or 16b. However, a common pump and a common tank may be provided.

The control unit 1a is associated with an operating cylinder 17a which is associated with a piston 18a having a piston rod 19a. The pressure area P1 of the piston 18a is twice as large as the pressure area 12 on the side carrying the piston rod 19a. Accordingly, one obtains a cylinder chamber 20a of larger pressure area and a cylinder chamber 21a of smaller pressure area. The control unit 1b is associated with a corresponding operating cylinder 17b having the stated components 18b to 21b. The two piston rods are pivoted to a cross-member 22 which is pivotable about a joint 23 and carries, for example, wheels 24 and 25 that are to be steered.

The two rotatable shafts 3a and 3b are intercoupled. The actuating member 4 acts on both shafts 3a and 3b by way of gearing 26. When the shafts turn in unison, the control valves are turned in different actuating directions by reason of the identical construction of the control units. In FIG. 2 it is assumed that the actuating member 4 has been turned in one direction so that the control valve of the control unit 1a assumes the position of FIG. 1a and the control valve of the control unit 1b assumes the position of FIG. 1c. The pump 15a then feeds the quantity Q of pressure fluid through the measuring motor 5 to the cylinder chamber 22a of larger pressure area. On adjustment of the piston 18a, the quantity Q of fluid forced out of the cylinder chamber 21a of smaller pressure area is likewise fed into the cylinder chamber 20a by way of the control valve. 2Q therefore flow through the operating cylinder conduit 13a. The pump 15b likewise feeds the quantity Q through the measuring motor 5 and further into the cylinder chamber 21b of smaller pressure area. At the same time, the quantity 2Q is discharged from the cylinder chamber 20b of larger pressure area to the tank. A measuring device is therefore disposed in the supply conduit from the pressure source to the respective cylinder. Both measuring devices carry the same amount of pressure fluid.

If, now, the actuating member 4 is turned in the opposite direction, the control valve of the control unit 1a assumes the position of FIG. 1c and the control valve of the control unit 1b assumes the position of FIG. 1a. This reverses the conditions in the two operating cylinders 17a and 17b in relation to FIG. 2. Nevertheless, the same quantities are delivered by the pumps and measured by the measuring motors.

The control system as described is suitable for the control of small and large land vehicles and water craft and in all cases where two mechanically intercoupled operating cylinders are provided and two independently functioning hydraulic circuits are to be used.

I claim:

1. A hydraulic steering control system, comprising two hydraulic cylinders each having a piston with a piston rod extending through one end thereof, the rod side of each said piston having a smaller pressure area than the opposite side thereof, each of said cylinders having designated nonrod and rod ends with first and second ports respectively at the nonrod and rod ends thereof, a pivotally mounted steering lever having oppositely movable ends connecting said piston rods, fluid pressure source means and exhaust tank means, valve means for each of said cylinders, steering control means for operating said valve means in unison, said valve means having passages arranged so that turning said steering control means in one direction causes said first and second ports of one of said cylinders and said second port of the other of said cylinder to be connected to said fluid pressure source means and said first port of the other said cylinder to be connected to said exhaust tank means, and vice versa for turning in the other direction.

2. A hydraulic control system according to claim 1 including metering means, said valve passages being arranged so that said metering means is supplied said pressure source means for either direction of turning.

3. A hydraulic control system according to claim 2 wherein said pressure source means includes a separate pumping unit for each said valve means associated with each of said cylinders.

4. A hydraulic control system according to claim 1 wherein said valve passages are arranged so that for a neutral position said pressure source is shunted to said exhaust tank.

5. A hydraulic control system according to claim 1 wherein the nonrod side of each said piston has an area of about twice the area of said rod side thereof.

6. A hydraulic control system according to claim 1 wherein said valve operating means includes a pair of shafts, and a steering wheel for turning said shafts.

* * * * *